US012346738B2

(12) United States Patent
Ahlgren et al.

(10) Patent No.: US 12,346,738 B2
(45) Date of Patent: Jul. 1, 2025

(54) ARCHITECTURE FOR CLOUD-BASED DATA ANALYTICS SYSTEM

(71) Applicant: Alteryx, Inc., Irvine, CA (US)

(72) Inventors: Stephen Gilbert Ahlgren, Black Mountain, NC (US); William Andrew Neal, Denver, CO (US); Chad Robert Auld, Thornton, CO (US)

(73) Assignee: Alteryx, Inc., Irvine, CA (US)

( * ) Notice: Subject to any disclaimer, the term of this patent is extended or adjusted under 35 U.S.C. 154(b) by 0 days.

(21) Appl. No.: 18/403,603

(22) Filed: Jan. 3, 2024

(65) Prior Publication Data

US 2024/0385993 A1    Nov. 21, 2024

Related U.S. Application Data

(60) Provisional application No. 63/503,373, filed on May 19, 2023, provisional application No. 63/503,370,
(Continued)

(51) Int. Cl.
*G06F 7/02* (2006.01)
*G06F 9/50* (2006.01)
(Continued)

(52) U.S. Cl.
CPC ............ *G06F 9/505* (2013.01); *G06F 9/5072* (2013.01); *G06F 9/547* (2013.01); *G06F 16/13* (2019.01);
(Continued)

(58) Field of Classification Search
CPC ...... G06F 16/164; G06F 16/81; G06F 16/192; G06F 16/13; G06F 9/505; G06F 16/182;
(Continued)

(56) References Cited

U.S. PATENT DOCUMENTS 12,079,220 B2 * 9/2024 Colcord ................. G06F 21/54
2021/0004277 A1 * 1/2021 Jubinski ................ G06F 9/4881
(Continued)

FOREIGN PATENT DOCUMENTS

WO   2024242967 A2   11/2024

OTHER PUBLICATIONS

Dessalk, Yared, et al., "Scalable Execution of Big Data Workflows using Software Containers", ResearchGate, Oct. 2020, 9 pages.
(Continued)

*Primary Examiner* — Bruce M Moser
(74) *Attorney, Agent, or Firm* — FIG. 1 Patents

(57) ABSTRACT

The present patent application discloses a data analytics system with a split plane architecture that utilizes a workflow management module in a control plane for cloud-based computing. The system receives workflow files from client devices and stores those workflow files in a cloud storage associated with the user. The data plane, which executes the workflow file, retrieves the file directly from the cloud storage or through an API provided by the workflow management module. A workflow engine wrapper, containing a stager system and an execution system, prepares workflow files for execution and stores generated results in the cloud storage.

20 Claims, 9 Drawing Sheets

Related U.S. Application Data filed on May 19, 2023, provisional application No. 63/503,368, filed on May 19, 2023.

(51) Int. Cl.
| | | |
|---|---|---|
| *G06F 9/54* | (2006.01) | |
| *G06F 16/00* | (2019.01) | |
| *G06F 16/13* | (2019.01) | |
| *G06F 16/16* | (2019.01) | |
| *G06F 16/182* | (2019.01) | |
| *G06F 16/188* | (2019.01) | |
| *G06F 16/25* | (2019.01) | |
| *G06F 16/81* | (2019.01) | |

(52) U.S. Cl.
CPC .......... *G06F 16/164* (2019.01); *G06F 16/182* (2019.01); *G06F 16/192* (2019.01); *G06F 16/254* (2019.01); *G06F 16/81* (2019.01); *G06F 2209/503* (2013.01)

(58) Field of Classification Search
CPC ...... G06F 16/254; G06F 9/5072; G06F 9/547; G06F 2209/503
See application file for complete search history.

(56) References Cited

U.S. PATENT DOCUMENTS

| | | |
|---|---|---|
| 2021/0133650 A1 | 5/2021 | Cella et al. |
| 2022/0066422 A1 | 3/2022 | Kunnath et al. |
| 2022/0103713 A1* | 3/2022 | Shibata .............. H04N 1/32459 |
| 2022/0197249 A1 | 6/2022 | Ma et al. |
| 2023/0063458 A1 | 3/2023 | Bhuiyan |
| 2024/0385890 A1 | 11/2024 | Ahlgren et al. |

OTHER PUBLICATIONS

Flyte Authors , "Flyte Documentation", Release 0.0.1, Jun. 25, 2020, 40 pages.
PCT/US24/29500 , "PCT Search Report and Written Opinion", PCT Application No. PCT/US24/29500, Oct. 23, 2024, 17 pages.

\* cited by examiner

ARCHITECTURE FOR CLOUD-BASED DATA ANALYTICS SYSTEM

CROSS-REFERENCE TO RELATED APPLICATIONS

This application claims the benefit of U.S. Provisional Patent Applications 63/503,368, 63/503,370, and 63/503,373, each of which was filed on May 19, 2023 and is incorporated by reference.

BACKGROUND

Data analytics involves extracting information having business value from large data sets. For example, a small business may utilize a third-party data analytics environment employing dedicated computing and human resources to gather, process, and analyze vast amounts of data from various sources, such as external data providers, internal data sources (e.g., files on local computers), Big Data stores, and cloud-based data (e.g., social media information). A data analytics system provides these services for smaller entities that need data analytics but lack the computing resources to perform these processes themselves.

The data analytics system may provide a software application that includes software tools to design and execute repeatable workflows, via a visual graphical user interface (GUI). As an example, a GUI associated with the data analytics system may offer a drag-and-drop workflow environment for data preparation, data blending, data processing, and advanced data analytics. Moreover, a workflow can include a series of data processing tools that perform specific processing operations or data analytics functions. The software application may be desktop-based, server-based, on-premises, or cloud-based. Data analytics systems often benefit from the computing resources available in cloud computing environments. However, a major gap remains in workflow execution support on cloud computing environments.

SUMMARY

A data analytics system with a split plane architecture uses a workflow management module of a control plane to enable cloud-based computing capabilities. A control plane of the data analytics system receives a request from a user to execute a workflow from a workflow file stored in a cloud storage account. A workflow file is a file that describes the steps of a workflow to be executed by the data analytics system. For example, the workflow file may be a JSON or XML file that describes the steps of the workflow to be executed. In some cases, the workflow file is a packaged workflow file that also stores dependency files.

The control plane publishes a message to a message queue that requests a job to execute the workflow and a data plane consumes the message when it has sufficient resources to execute a new job. An execution service in the data plane creates an engine wrapper container within the data plane. This wrapper container houses an execution engine for executing the workflow. The execution engine wrapper container retrieves the packaged workflow file from the cloud storage account using job metadata in the message from the message queue and executes the workflow file using the execution engine to generate results of the workflow. When the execution service determines that the job has been completed, the execution service deletes the execution engine wrapper container and transmits the results from executing the workflow file to cloud storage for storing such that the user of the client device can retrieve the results as needed.

The control plane of the data analytics system may also be used to coordinate the storage and retrieval of a packaged workflow file using an API endpoint. The control plane receives a packaged workflow file from a client device of a user and stores the packaged workflow file to a cloud storage account. The control plane receives an API request for the packaged workflow file from an execution engine wrapper container running on a data plane. This data plane may be a data plane of the data analytics system or may be executed by a third-party system. The control plane retrieves the packaged workflow file from the cloud storage account using an identifier in the API request and transmits the packaged workflow file to the execution engine wrapper container. The control plane receives a result of executing the workflow from the data plane and transmits the results of the execution to the cloud storage account for storing.

The data plane may use the execution engine wrapper container to prepare workflow files for execution by an execution engine. The execution service of a data plane receives a request to execute a workflow in a packaged workflow file. The execution service creates an execution engine wrapper container that includes a staging system, a worker system, and an execution engine. The execution service provides a job request to the worker system, which invokes the staging system to retrieve the packaged workflow file and unpack its contents to a local filesystem. The worker system then initiates execution of the packaged workflow file by the execution engine. The worker system receives the results from the execution of the workflow and provides the results of the execution to the control plane of the data analytics system.

The figures depict various embodiments for purposes of illustration only. One skilled in the art will readily recognize from the following discussion that alternative embodiments of the structures and methods illustrated herein may be employed without departing from the principles of the embodiments described herein. Like reference numbers and designations in the various drawings indicate like elements.

DETAILED DESCRIPTION

Figure 1:
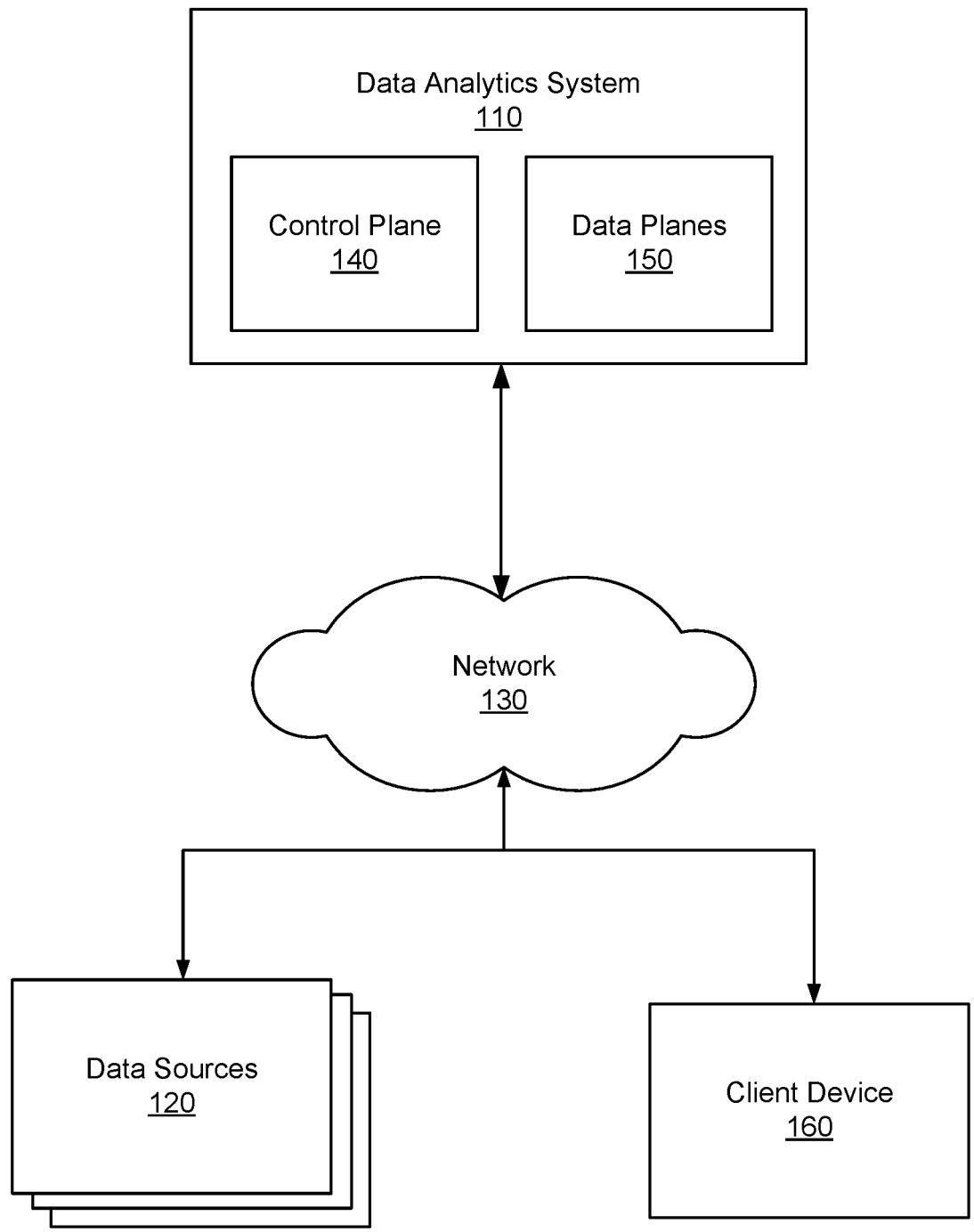
FIG. 1 is a block diagram illustrating a data analytics environment including a data analytics system according to one embodiment.

FIG. 1 is a block diagram illustrating a data analytics environment including a data analytics system 110 according to one embodiment. The environment further includes multiple data sources 120 and a client device 160 connected to the data analytics system 110 via a network 130. Although the illustrated environment contains only one data analytics system 110 coupled to multiple data sources 120, embodiments can have multiple data analytics systems and a singular data source.

The data sources 120 provide electronic data to the data analytics system 110. A data source 120 may be a storage device such as a hard disk drive (HDD) or solid-state drive (SSD), a computer managing and providing access to multiple storage devices, a storage area network (SAN), a database, or a cloud storage system (e.g., data warehouse or data lake on a cloud platform). A data source 120 may also be a computer system that can retrieve data from another source. The data sources 120 may be remote from the data analytics system 110 and provide the data via the network 130. In addition, some or all data sources 120 may be directly coupled to the data analytics system and provide the data without passing the data through the network 130.

The data provided by the data sources 120 is typically organized into data records, which each data record including one or more values. For example, a data record provided by a data source 120 may include a series of comma-separated values. The data describe information of relevance to an enterprise using the data analytics system 110. For example, data from a data source 120 can describe computer-based interactions (e.g., click tracking data) with content accessible on websites and/or with social media applications.

The data analytics system 110 is a computer-based system utilized for processing and analyzing large amounts of data. The data are collected, gathered, or otherwise accessed from the multiple data sources 120 directly or via the network 130. The data analytics system 110 can implement scalable software tools and hardware resources employed in accessing, preparing, blending, and analyzing data from a wide variety of data sources. For instance, the data analytics system 110 supports the execution of data intensive processes and workflows.

The data analytics system 110 processes and analyzes data obtained from one or more of the data sources 120. In some cases, the data analytics system 110 provides software that supports network, or cloud-based, access to data analytic tools and macros by multiple end users. As an example, data analytics system 110 allows users to share, browse, and consume analytics in a manner similar to a mobile application store or other cloud-based service. Analytic data, macros, and workflows can be packaged and executed as a smaller scale and customizable analytic application (i.e., an app), for example, that can be accessed by other users of the data analytics system 110.

In some cases, access to published analytic apps can be managed by the data analytics system 110, namely granting or revoking access, and thereby providing access control and security capabilities. The data analytics system 110 can perform functions associated with analytic apps such as creating, deploying, publishing, iterating, updating, and the like. Additionally, the data analytics system 110 can support functions performed at various stages involved in data analytics, such as the ability to handle errors occurred during data analytics, the ability to access, prepare, blend, analyze, and output analytic results, etc.

In one embodiment, the data analytics system 110 supports a software tool to design and execute repeatable workflows, via a visual GUI. As an example, a GUI associated with the data analytics system 110 offers a drag-and-drop workflow environment for data blending, data processing, and advanced data analytics. Moreover, a workflow can include a series of data processing tools that perform specific processing operations or data analytics functions. Each tool that is part of a workflow performs a function related to data that is specific to the tool. As an example, a workflow can include tools implementing various data analytics functions including one or more of the following: input/output; preparation; join; predictive; spatial; investigation; and parse and transform operations. More details about workflow are described in conjunction with FIG. 2.

Therefore, the software tool allows a user to create workflows in a low-code or no-code environment, that is, without in-depth knowledge of data processing languages such as SQL. In one instance, the software tools are encapsulated in a desktop-based application that the user downloads and installs on a local machine or is an on-premise application installed on computers on premised of a user or organization (e.g., business). Through the application, a user can flexibly create workflows that perform one or more processing operations on input data sources 120 to generate output data as a result of the processing operations.

However, many of the input data sources for these workflows require significant storage capability (e.g., millions or billions of rows) and are stored in data sources 120 configured on cloud computing environments. For example, the data sources 120 may be part of a data lake or a data warehouse configured on a cloud environment. There remains a major gap in workflow execution support on cloud computing environments as existing cloud capabilities may not support editing or executing many workflows created by the software application on desktop. Therefore, a solution is needed that allows execution of workflows adjacent to the data in the cloud computing environment.

Thus, in one embodiment, the data analytics system 110 configures a cloud execution ecosystem that seamlessly facilitates the execution of workflows adjacent to the data sources 120, without restrictions on the chosen vendor or location of the cloud computing environment. The cloud execution ecosystem is a pattern and a collection of components, services, and capabilities with a goal of supporting uniform engine execution across multiple cloud environments. The cloud execution ecosystem of the data analytics system 110 includes a control plane 140 and a set of data planes 150 that perform the tasks described above.

The control plane is a logical plane (e.g., a virtual private cloud) that stores and manages shared resources of the data analytics system 110. For example, the control plane 140 handles tasks related to network management and configuration, message routing, and policy enforcement for the data analytics system 110. In one embodiment, the control plane 140 is configured as a multi-tenant plane where each account or tenant of the data analytics system 110 share the same compute resources for coordinating these services. The control plane 140 may be operated under the data analytics system 110's cloud account infrastructure.

The data planes 150 are logical planes (e.g., virtual private clouds) which handles data processing tasks for the data analytics system 110. For example, the data planes 150 store, access, and provide data for users and perform computations and analytics on data. An account (e.g., customer organization) of the data analytics system 110 may host one or more data plane instances 150 with compute resources dedicated to that account in a secure environment. In one embodiment, a data plane 150 within the cloud execution ecosystem described herein may be configured with a containerized engine and is established with a specification for job orchestration, metadata exchange, data ingress and egress contract, and the like, as described in further detail below.

In this manner, supported execution environments follow a pattern in which services such as user authentication, workflow publishing, job scheduling, and result viewing experiences are consistent across different types of cloud environments. However, each type of execution environment may have specific implementations based on the constraints and limitations for that environment.

Moreover, one way to address execution of data processing operations on cloud platforms may be to perform SQL pushdown by converting and optimizing workflows to a language such as SQL and have the SQL code execute in the native computing environment of the data sources. However, even with the SQL pushdown, data movement remains a pain point and data are shuffled from one computing environment to another. This is suboptimal for a variety of reasons, including cost, performance, and data security and data residency. Moreover, many data analytics processes require capabilities beyond these, such as artificial intelligence and machine learning, spatial, reporting and visualization, data connector, and custom code. Therefore, the cloud execution ecosystem described herein allows workflow execution to be performed by pushing the execution engines closer to the source and enabling the engines to execute within different ecosystems. The control plane 140 and the data planes 150 are described in further detail below.

The network 130 represents the communication pathways between the data analytics systems 110 and data sources 120. In one embodiment, the network 130 is the Internet and uses standard communications technologies and/or protocols. Thus, the network 130 can include links using technologies such as Ethernet, 802.11, worldwide interoperability for microwave access (WiMAX), 3G, Long Term Evolution (LTE), digital subscriber line (DSL), asynchronous transfer mode (ATM), InfiniBand, PCI Express Advanced Switching, etc. Similarly, the networking protocols used on the network 130 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc.

The data exchanged over the network 130 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above.

The client device 160 is a device through which a user may interact with the data analytics system 110. The client device 160 can be a personal or mobile computing device, such as a smartphone, a tablet, a laptop computer, or desktop computer. In some embodiments, the customer client device 160 executes a client application that uses an application programming interface (API) to communicate with the data analytics system 110. The client device 160 may transmit query requests to the data analytics system 110 and receive responses to those queries from the data analytics system 110. For example, the client device 160 may use an access token to communicate directly with the data plane 150 of the data analytics system 110. The client device's interactions with the data analytics system are described in further detail below.

In one embodiment, a user of a client device 160 may download and install software tools or applications from the data analytics system 110 that allow the user to create workflows to perform data processing operations (e.g., extract, transform, load (ETL) operations) on data sources via a GUI. In one embodiment, the user may connect to the cloud execution ecosystem of the data analytics system 110 to schedule and execute the workflow using computing resources on the cloud.

Figure 2:
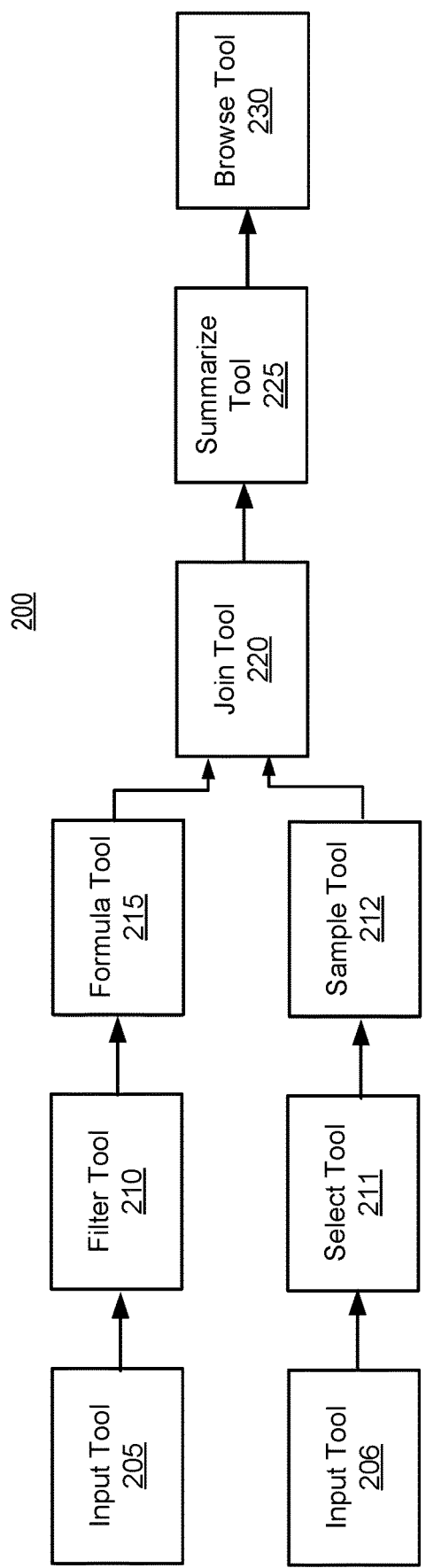
FIG. 2 is a block diagram illustrating a workflow created using the data analytics system to process data according to one embodiment.

FIG. 2 is a block diagram illustrating a workflow 200 created using the data analytics system 110 to process data according to one embodiment. In one embodiment, the workflow 200 is created using a visual workflow environment supported by a GUI of the data analytics system 110. The visual workflow environment enables a set of drag and drop tools that eliminate the need for providing software code to design a workflow and eliminate the need to identify complex formulas to be implemented by the workflow. In another embodiment, the workflow 200 is created and described in a document, such as an XML document. The workflow 200 is executed by a computer device of the data analytics system 110. However, in other embodiments, the workflow 200 is deployed to another computer device that may be communicatively connected, via a network (e.g., network 130), to the data analytics system 110.

A workflow can include a series of tools that perform specific processing operations or data analytics functions. As a general example, tools of a workflow can perform one or more of the following data analytics functions: input/output; preparation; join; predictive; spatial; investigation; and parse and transform operations. Implementing a workflow can involve defining, executing, and automating a data analytics process, where data is passed to each tool in the workflow, and each tool performs its respective processing operation on the received data. Data records can be passed through the tools of a workflow. For example, a packet including an aggregated group of individual data records can be passed through the tools of a workflow, which allows for the individual processing operations to operate more efficiently on the data. Such aggregation techniques can increase the speed of developing and running workflows, even with processing large amounts of data. A workflow can define, or otherwise structure, a repeatable series of operations, specifying an operational sequence of the specified tools. In some cases, the tools included in a workflow are performed in a linear order. In other cases, multiple tools execute in parallel.

As illustrated, the workflow 200 of FIG. 2 includes input/output tools, illustrated as input tools 205 and 206 and a browse tool 230. The input tools 205 and 206 function to access data records from particular data sources 120. The input tools 205 and 206 bring into the workflow the accessed data records and provide the data records to the subsequent tools of the workflow 200. In this example, the input tool 205 provides accessed data records to a filter tool 210 and the input tool 206 provides accessed data records to a select tool 211. The browse tool 230 is located at the end of the workflow 200 and receives the output resulting from the execution of each of the upstream tools of the workflow 200. Although the browse tool 230 is located at the end of the workflow 200 in this example, the browse tool 230 can be added at any point in a workflow to review and verify results from execution of upstream tools of the workflow.

In continuing with the example of FIG. 2, the workflow 200 includes preparation tools, shown as the filter tool 210, the select tool 211, a formula tool 215, and a sample tool 212. The filter tool 210 queries data records based on an expression and splits the data into two streams, a true stream that includes data records that satisfy the expression and a false stream that includes data records that do not satisfy the expression. The select tool 211 can be used to select, deselect, reorder and rename fields, change field type or size, and assign a description. The formula tool 215 creates or updates fields using one or more expressions to perform a broad variety of calculations and/or operations. The sample tool 212 limits a received stream of data records to a number, percentage, or random set of data records. The workflow 200 also includes a join tool 220 that blends multiple data sources. Specifically, the join tool 220 combines two input data streams based on common fields (or data record position).

The workflow 200 of FIG. 2 is also shown to include a summarize tool 225 which is a parse and transform tool that can restructure and re-shape data to a format used in further analysis. The summarize tool 225 can also perform summarization of data by grouping, summing, counting, spatial processing, and string concatenation. In one embodiment, the output generated by the summarize tool 225 contains the results of the calculation(s).

In some embodiments, execution of the workflow 200 will cause the input tool 205 to pass data records (e.g., one at a time) through the filter tool 210 and the formula tool 215, until all data records are processed and have reached the join tool 220. Thereafter, the input tool 206 will begin passing data records one at a time through the select tool 211 and sample tool 212, until the data records are passed to the same join tool 220. Some individual tools of the workflow 200 can possess the capability to implement their own parallel operation, such as initiating a read of a block of data while processing the last block of data or breaking computer-intensive operations, such as a sort tool, into multiple parts. However, in some existing workflow techniques, each data record from a set of data records is individually processed by each tool of the workflow one data record at a time, in a pipeline fashion, until a tool in the workflow is reached that requires multiple data records to perform the processing operation (e.g., sort tool, join tool, summarize tool, etc.)

The particular naming of the components, capitalization of terms, the attributes, data structures, or any other programming or structural aspect is not mandatory or significant, and the mechanisms that implement the embodiments described may have different names, formats, or protocols. Further, the systems may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

1. Execution of Workflows in Cloud Execution Ecosystem

Figure 3:
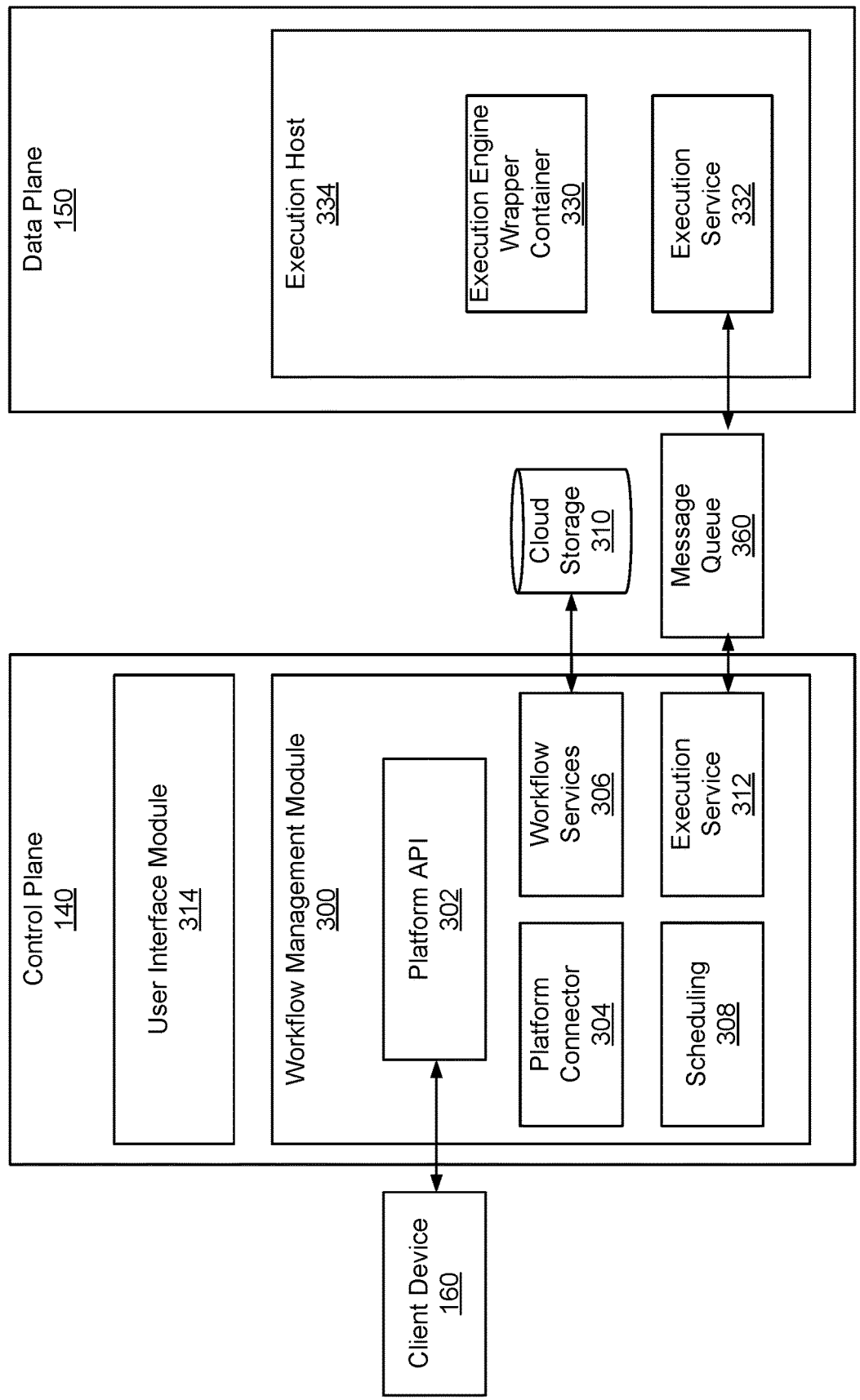
FIG. 3 illustrates an example data flow through the data analytics system environment illustrated in FIG. 1, in accordance with some embodiments.

FIG. 3 illustrates an example data flow through the cloud execution ecosystem of the data analytics system 110 illustrated in FIG. 1, in accordance with some embodiments. Alternative embodiments may include more, fewer, or different components and the functionality described below may be divided among the components differently from the below description. Additionally, each component may perform their respective functionalities automatically without human intervention.

In one embodiment, the cloud execution ecosystem includes a control plane 140 and a data plane 150. The control plane 140 includes a workflow management module 300 and a user interface (UI) module 314. In one embodiment, the workflow management module 300 includes components such as a platform API 302, a platform connector 304, a workflow services module 306, a scheduling module 308, and an execution service (for control plane) 312. In one embodiment, the example data plane instance 150 shown in FIG. 3 is under an account owned by the user but managed by the data analytics system 110. The data plane 150 includes an execution host 334. The execution host 334 includes an execution engine wrapper container 330 and an execution service (for the host) 332.

A user of a client device 160 authenticates with the ecosystem using, for example, a desktop software application. After the user creates a workflow using the software application, the client device 160 transmits workflow files to the control plane 140. In one instance, the workflow file is a file that describes the steps of a workflow to be executed by the data analytics system 110. For example, the workflow file may be a JSON or XML file that describes the steps of the workflow to be executed. The workflow file may have a type that indicates what information the workflow file stores. For example, the workflow file may be a baseline workflow file type where the workflow file only stores the steps of the workflow. This file type may refer to dependency files that the workflow uses but may not contain the dependency files themselves.

In one embodiment, the workflow file also may be a packaged workflow file type, also described herein as a portable execution artifacts (PEA's). A packaged workflow file type (e.g., YXZP) is configurable to store a baseline workflow file as well as dependency files that the workflow uses when executed. In one embodiment, the user may publish a PEA via the workflow services module 306, and the cloud execution ecosystem is equipped with a set of requirements and capabilities to support desktop workflow execution in the cloud.

The workflow services module 306 of the control plane 140 of the data analytics system 110 receives the packaged workflow file (that is, the PEA) published from the client device 160 at the workflow management module 300. The workflow services module 306 of the workflow management module 300 manages the storage and execution of the packaged workflow files. The workflow management module 300 receives packaged workflow files from client devices 160 and stores those workflow files in cloud storage 310. The workflow management module 300 may also convert workflow files between different types. In some embodiments, the cloud storage 310 is a user's private cloud storage with which the data analytics system 110 interfaces. For example, the user may establish a cloud storage 310 with a third-party system or may operate their own storage for packaged workflow files. Alternatively, the cloud storage 310 may be storage within the data analytics system 110 that is used by the user for storing packaged workflow files.

The workflow management module 300 stores packaged workflow files in cloud storage 310 for later execution by an execution engine in the execution engine wrapper container 330. Through a UI generated by the UI module 314, the user is able to browse the user's workspace in the cloud execution ecosystem and schedule the published workflow (associated with a packaged workflow file) for future execution in conjunction with the scheduling module 308. The workflow management module 300 may store packaged workflow files in association with an execution time for when the corresponding workflows should be executed by the workflow engine 320.

In some embodiments, the execution service 312 of the data analytics system 110 uses a message queue 360 to coordinate the execution of workflows. For example, when the control plane 140 receives a request to schedule a PEA from the client device 160, the execution service 312 of the workflow management module 300 may publish a workflow job message to the message queue 360 to be listened by an instance of a data plane 150 for the user. The workflow job message includes an identifier for the PEA and job metadata. Using the job metadata, the execution service 312 identifies the appropriate message topic (queue) for the job and queues up a job request (message) in the message queue 360 that adheres to a pre-defined message schema (contract). In an alternative embodiment, the user may have an option to execute the workflow immediately instead of having to schedule execution of the workflow through the scheduling module 308.

When a data plane 150 has resources available to execute a workflow, the execution service 332 within the execution host 334 of the data plane 150 subscribes to an appropriate message topic (queue) on the message queue 360 and listens for jobs for execution. The execution service 332 picks up the pending workflow job request for the topic and initializes a job for the workflow. The execution service 332 creates an instance of the execution engine wrapper container 330, which is an ephemeral container. The execution service 332 passes job configuration details, metadata, runtime settings, and the like to the execution engine wrapper container 330.

The execution engine wrapper container 330 performs pre-workflow and post-workflow staging tasks. To execute the workflow in a packaged workflow file, the execution engine wrapper container 330 receives the packaged workflow file from the workflow management module 300 (e.g., through an API request) or by retrieving the packaged workflow file directly from the cloud storage 310 (after obtaining access token to the cloud storage 310 from the platform API 302). The execution engine wrapper container 330 may use the workflow file identifier to retrieve the packaged workflow file from the cloud storage 310 directly or may use the platform API 302 of the workflow management module 300 to cause the workflow management module 300 to retrieve the workflow file from the cloud storage 310 for the execution engine wrapper container 330. In some embodiments, the message queue 360 uses an Apache Kafka queuing system to manage workflow job messages.

Responsive to retrieving the PEA, the execution engine wrapper container 330 initializes an execution engine and runs the job to generate results. The execution engine wrapper container 330 posts the results of the job to the cloud storage 310 through the platform API 302. The data plane 150 listens for job status and upon completion, communicates this status back to the control plane 140 (e.g., job successful or job failed).

Figure 4:
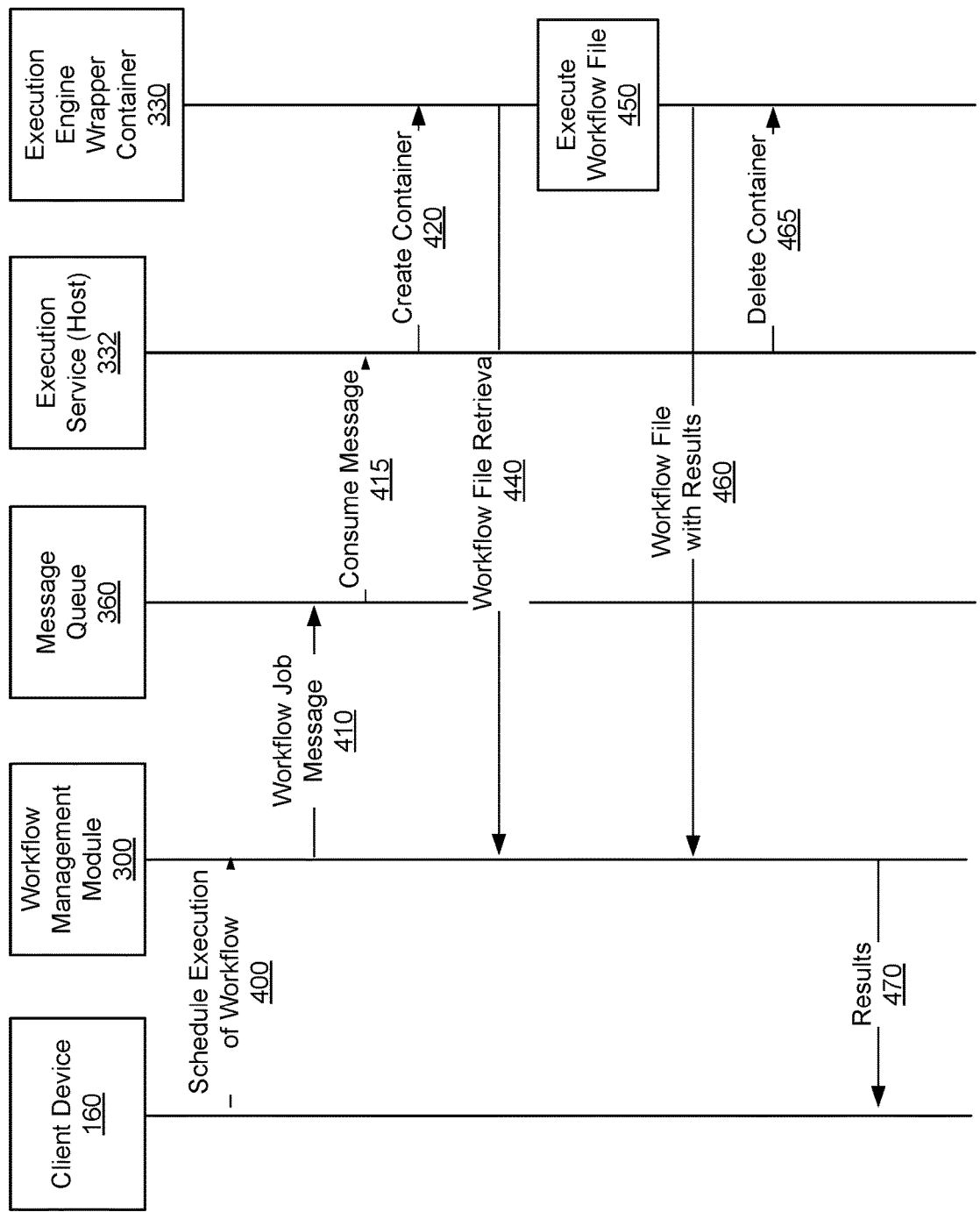
FIG. 4 is an interaction diagram that illustrates an example data flow for executing a workflow packaged as a PEA from a client device, in accordance with some embodiments.

FIG. 4 is an interaction diagram that illustrates an example data flow for executing a workflow packaged as a PEA from a client device 160, in accordance with some embodiments. Alternative embodiments may include more, fewer, or different steps and the steps may be performed in a different order, or by different components or systems, than those illustrated in FIG. 4.

The workflow management module 300 receives a packaged workflow file 400 from the client device 160. The workflow management module 300 may receive a baseline workflow file or a packaged workflow file from the client device 160. The workflow management module 300 stores the workflow file 400 in cloud storage 310 via, for example, the workflow services module 306. The workflow management module 300 publishes a workflow job message 410 to the message queue 360. The workflow job message 410 includes a workflow file identifier that identifies the PEA of the packaged workflow file in the cloud storage 310.

When a data plane 150 has resources available to execute a workflow, an execution service 332 of an execution host 334 of the data plane 150 consumes 415 a message for a job request. The execution service 332 creates 420 an ephemeral execution engine wrapper container 330. The execution engine wrapper container 330 extracts the workflow file identifier from the workflow job message 410 and retrieves 440 the workflow file 400 from the cloud storage 310 using the workflow file identifier and an access token. The cloud storage 310 provides the workflow file 400 to the execution engine wrapper container 330. In some embodiments, rather than requesting the workflow file from the cloud storage 310 directly, the execution engine wrapper container 330 uses an API of the workflow management module 300 to cause the workflow management module 300 to retrieve the workflow file from the cloud storage 310 on behalf of the execution engine wrapper container 330.

The execution engine wrapper container 330 prepares the workflow file for execution by a workflow engine (e.g., may separate the workflow steps from dependency files), and causes the workflow file to be executed 450 by the execution engine. The execution engine wrapper container 330 publishes the results of the executed workflow by storing the results 460 in the cloud storage 310. The workflow management module 300 may retrieve the results 460 from the cloud storage 310 and provide the results 470 to the client device 160. Moreover, the execution service 332 deletes 465 the ephemeral container after the job has been completed.

2. Portable Execution Artifacts (PEA's) and Workflow Services

Figure 5:
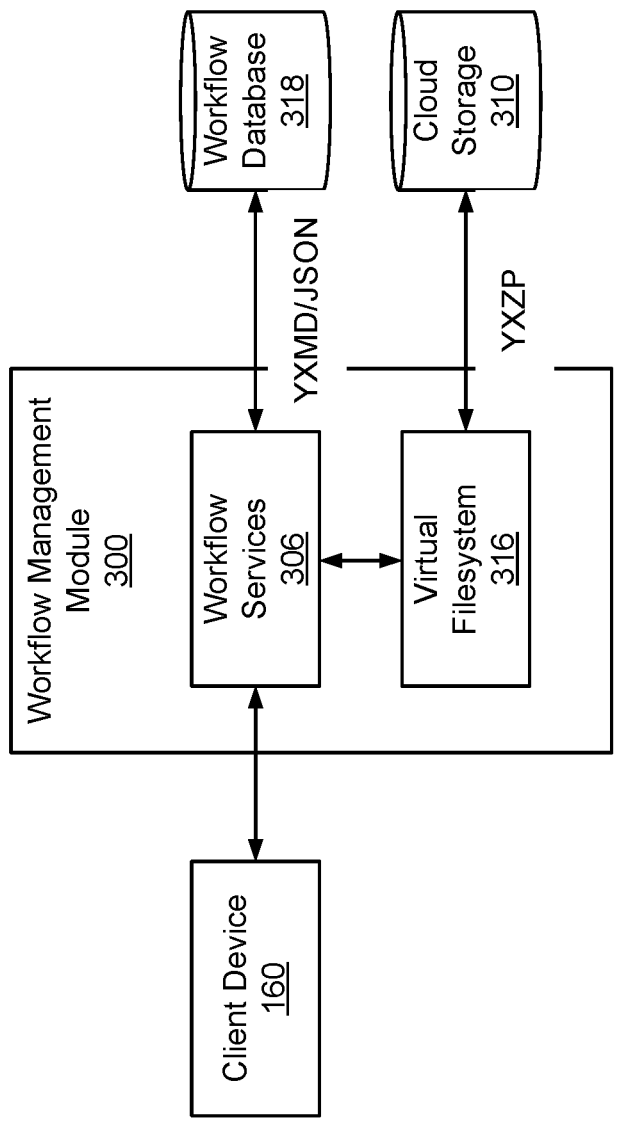
FIG. 5 illustrates an example data flow for the workflow services module, in accordance with some embodiments.

FIG. 5 illustrates an example data flow for the workflow services module, in accordance with some embodiments. As described above, the packaged workflow file is a PEA and is configurable to store a baseline workflow file as well as dependency files that the workflow uses when executed. In one instance, the workflow is a data transformation graph represented as XML or JSON file. The dependencies in a PEA may include embedded datasets, DBM files, macros, plugins, images, and any other file a workflow may reference. A user may package a workflow and its dependencies that were created on an application (e.g., desktop application) and publish these artifacts to the cloud execution ecosystem.

In one embodiment, the cloud execution ecosystem supports two types of workflow files, one being the desktop version and another being the cloud version. The desktop version is the workflows packaged as PEA's stored in a cloud storage 310 account, as described in conjunction with FIG. 3. The cloud version of a workflow is executed based on a JSON representation, rather than executing packaged workflows. A desktop version of the workflow (i.e., the packaged workflow file) is executable by a first engine type, while a cloud version of the workflow is executable by a second engine type.

In one embodiment, the workflow services module 306 parses the packaged workflow files, transforming the primary workflow XML definition in the package into the workflow JSON representation. As described in conjunction with FIG. 3, the workflow services module 306 may store the packaged workflow files in the user's cloud storage 310 (e.g., using a virtual filesystem 316) and link the workflow objects (i.e., JSON representations of workflows) to the original binary packaged file for later execution. In one embodiment, the cloud version of the workflows is stored in a workflow database 318 of the control plane 140, and the desktop version of the workflows (i.e., PEA) is stored in the cloud storage account of the user and is abstracted away.

In this manner, the execution of existing cloud version workflows can be integrated into the cloud execution ecosystem. Moreover, the user can view and schedule both types of workflows for execution from the workspace. For example, in the workspace UI, the user may access a dropdown element where the user can select a workflow for execution (either desktop or cloud version) and select a vendor for the cloud platform. In one embodiment, responsive to a user initiating a request to execute a selected workflow, the scheduling module 308 may confirm whether the workflow for execution is of a desktop version or a cloud version, and whether the cluster computing resources for the user's workspace supports the appropriate type of execution engine. The scheduling module 308 may provide the job metadata as described in conjunction with FIG. 3.

During job execution, the execution engine wrapper container 330 uses the job metadata to locate, download, and extract the PEA from the cloud storage 310. Handling the PEA's in this manner enables supporting the execution of workflows in many different types of remote execution environments. Therefore, the workflow services module 306 may act as an API endpoint for retrieving packaged workflow files in the cloud storage 310 and providing the packaged workflow files from the cloud storage 310 to other execution systems. For example, the execution system may be a user's remote environment (i.e., instance of the data plane 150) managed by the data analytics system 110 or a user's remote environment managed by a third-party system which is a separate and different entity from the data analytics system 110. In these cases, the execution engine wrapper container 330 of the data plane 150 may use the API of the workflow services module 306 to pull packaged workflow files from the cloud storage 310 for execution.

In this manner, the workflows are executed with private data handling (PDH) features of the cloud execution ecosystem, where data access and engine execution (execution of the workflow) are isolated to cloud accounts owned by the user. With the introduction of desktop version and cloud version of workflow types, users can schedule both cloud versions and desktop versions of workflows from the same workspace view of the data analytics system 110.

Figure 6:
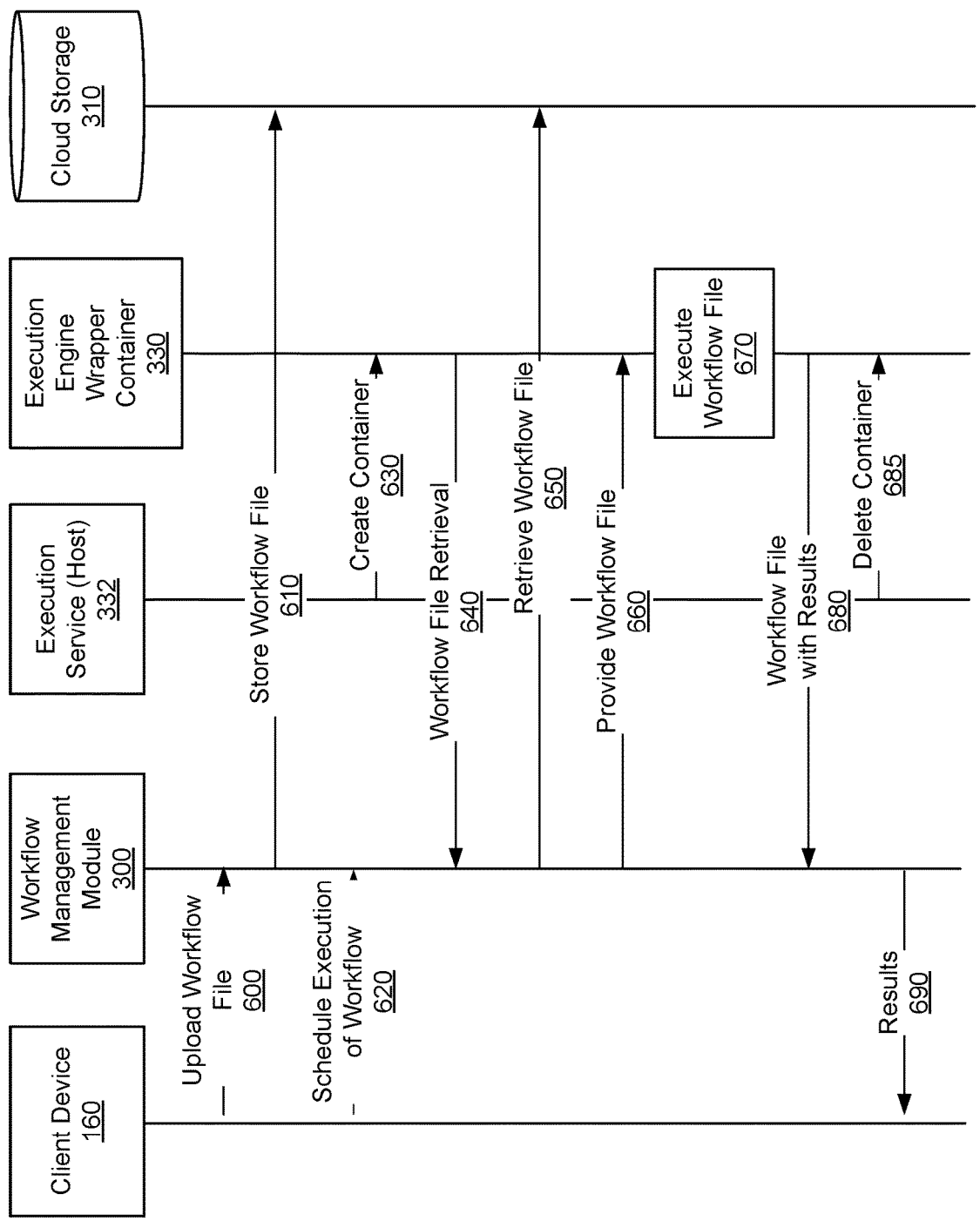
FIG. 6 is an interaction diagram that illustrates another example data flow for executing a workflow file from a client device, in accordance with some embodiments.

FIG. 6 is an interaction diagram that illustrates another example data flow for executing a workflow file from a client device 160, in accordance with some embodiments. Alternative embodiments may include more, fewer, or different steps and the steps may be performed in a different order, or by different components or systems, than those illustrated in FIG. 6.

The workflow management module 300 receives a packaged workflow file (PEA) 600 uploaded from the client device 160. In one instance, a component of the workflow management module 300 that receives the PEA is the workflow services module 306. The workflow management module 300 (the workflow services module 306) stores the workflow file 610 in the cloud storage 310. The cloud storage 310 account may be a user-owned storage account on the cloud.

The workflow management module 300 receives a request from the client device 160 to schedule 620 execution of a workflow. The workflow management module 300 schedules a job for executing the packaged workflow. For example, the job may be scheduled using a message queue 360, as described in conjunction with FIG. 3.

When a data plane 150 has resources available to execute a workflow, an execution service 332 of a host may create 630 an execution engine wrapper container 330, which is an ephemeral container. The execution engine wrapper container 330 extracts the workflow file identifier from the job metadata and submits a workflow file API request to retrieve 640 the packaged workflow file to the workflow management module 300. The API request is a request to an API provided by the workflow services module 306 of the workflow management module 300 to allow different execution engines to retrieve and store workflow files. In response to receiving the API request, the workflow management module 300 retrieves 650 the workflow file from the cloud storage 310. The workflow management module then provides the workflow file to the execution engine wrapper container 330.

The execution engine wrapper container 330 prepares 660 the workflow for execution by an execution engine (e.g., may separate the workflow steps from dependency files), and causes the workflow file to be executed 670 by the execution engine. The execution engine wrapper container 330 publishes 680 the results of the executed workflow to the workflow management module 300 for storage in cloud storage 310 or other target system and the execution service 322 may delete 685 the execution engine wrapper container 330. The workflow management module 300 may also provide the results 690 to the client device 160.

3. Execution Engine Wrapper Container

Figure 7:
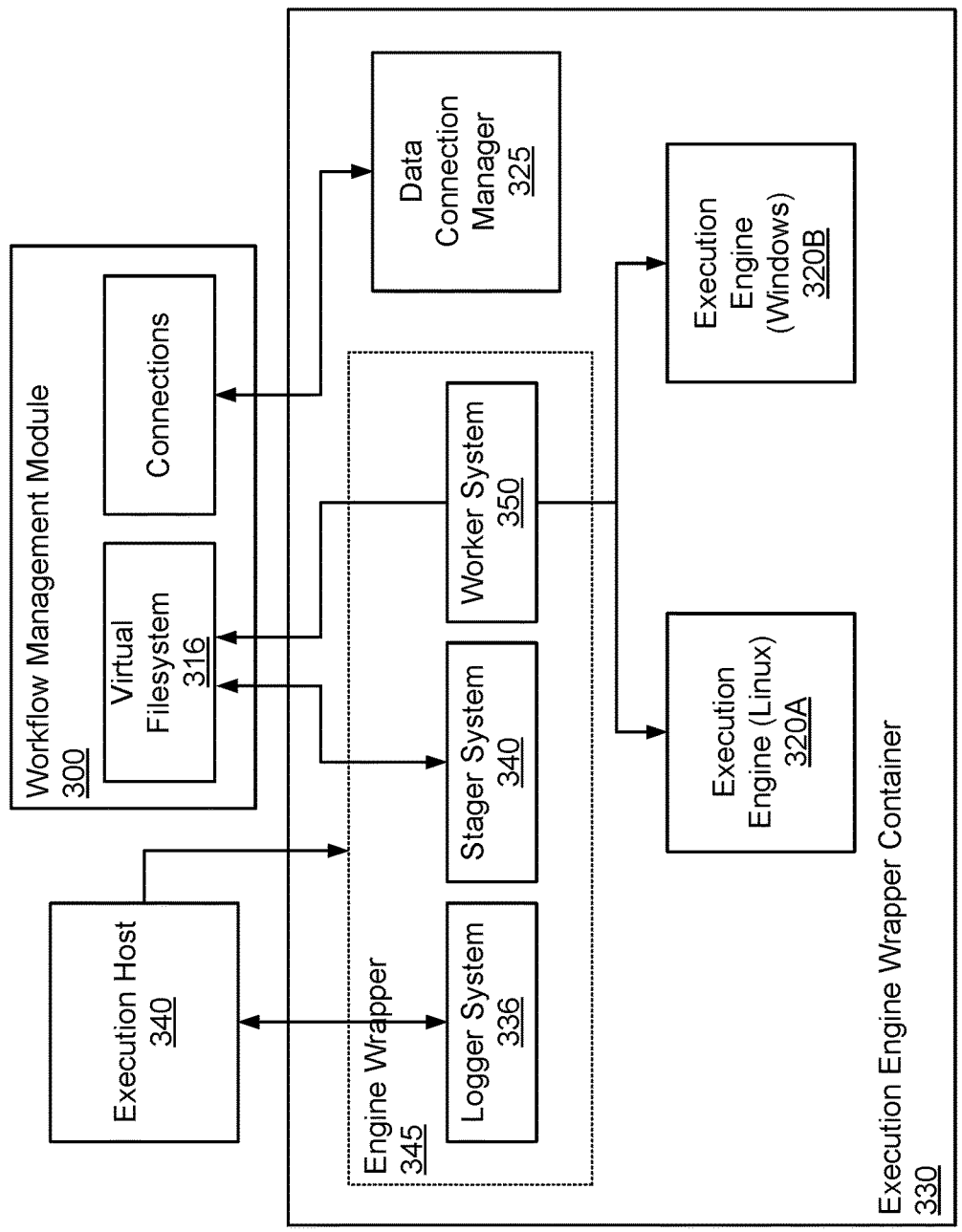
FIG. 7 illustrates an example data flow through the execution engine wrapper container, in accordance with some embodiments.

FIG. 7 illustrates an example data flow through the execution engine wrapper container, in accordance with some embodiments. In one embodiment, the execution engine wrapper container 330 includes an engine wrapper 345 including a logger system 336, a stager system 340, and a worker system 350. The execution engine wrapper container 330 also includes an execution engine 320 and a data connection manager 325, though the execution engine wrapper container 330 may include more, fewer, or different components.

In one embodiment, the execution engine wrapper container 330 is a containerized asynchronous job execution agent that defines a specification between a data processing engine and an engine wrapper 345 layer that provides ancillary engine capabilities required for execution. Specifically, the container 330 is deployed from a container image that includes executables and its package dependencies for running the container on a host system. The container image is a software artifact. In one instance, the container image for a particular execution engine wrapper container 330 may be associated with a set of parameters indicating which versions of the execution engines are contained in the packaged software. The container image may also be associated with a set of resource parameters that specify hardware configurations such as how much memory of the computing host should be allocated to an instance of the container, how many CPU units of the computing host can be allocated to the container, and the like.

The components of the execution engine wrapper container 330 receives PEA's as input and required data in data sources 120 to execute workflows. In one embodiment, the execution engine wrapper container 330 is cross-platform, which supports various operating systems such as Windows or Linux. Since components of the execution engine wrapper container 330 are encapsulated in a container, the cloud execution ecosystem of the data analytics system 110 can execute workflows packaged as PEA's close to the data sources 120 as long as the cloud computing resources support containers.

As described above in conjunction with FIG. 3, responsive to receiving a request to execute a workflow, the execution service 332 of the host may initiate the execution engine wrapper container 330. The engine wrapper 345 posts a job execution request to the worker system 350. The worker system 350 invokes the stager system 340 to retrieve the packaged workflow file (i.e., PEA) from the workflow management module 300 and prepares the corresponding workflow for execution by the execution engine 320. The stager system 340 extracts the primary workflow file and may extract dependency files from the PEA onto the local file system. The worker system 350 then invokes the execution engine 320 for the workflow job.

The worker system 350 retrieves the workflow files and interfaces with the execution engine 320 to execute the workflow described in a workflow file. The worker system 350 may receive a baseline workflow file from the stager system 340 and provide the workflow described by the workflow file to the execution engine 320 for execution. The worker system 350 may launch the execution engine 320 within the data plane 150 for the execution of the workflow file (e.g., through a command line instruction).

The execution engine 320 executes the workflow within the container. In one embodiment, execution of a workflow job requires access to one or more data sources 120 of the user (e.g., customer data). Thus, in one embodiment, an execution engine 320 requests a data connection manager 325 if credentials are needed for a data source 120. The data connection manager 325 retrieves credentials from the workflow management module 300, e.g., in the form of a connection string. Depending on the operating system (OS) of the host, the container 330 shown in FIG. 7 illustrates one example Linux-based execution engine 320A and another example Windows-based execution engine 320B. However, it is appreciated that in other embodiments, the execution engine wrapper container 330 can support other types of execution engines.

The worker system 350 receives the results of an executed workflow from the execution engine 320 and stores the results in the cloud storage 310. More specifically, the worker system 350 transmits the results of an executed workflow to the workflow management module 300 to be stored in the cloud storage 310. In some embodiments, the workflow management module 300 receives the results from the execution system 350 and stores the results in cloud storage 310 or another target storage system such that a user of the request can retrieve the results as needed.

Figure 8:
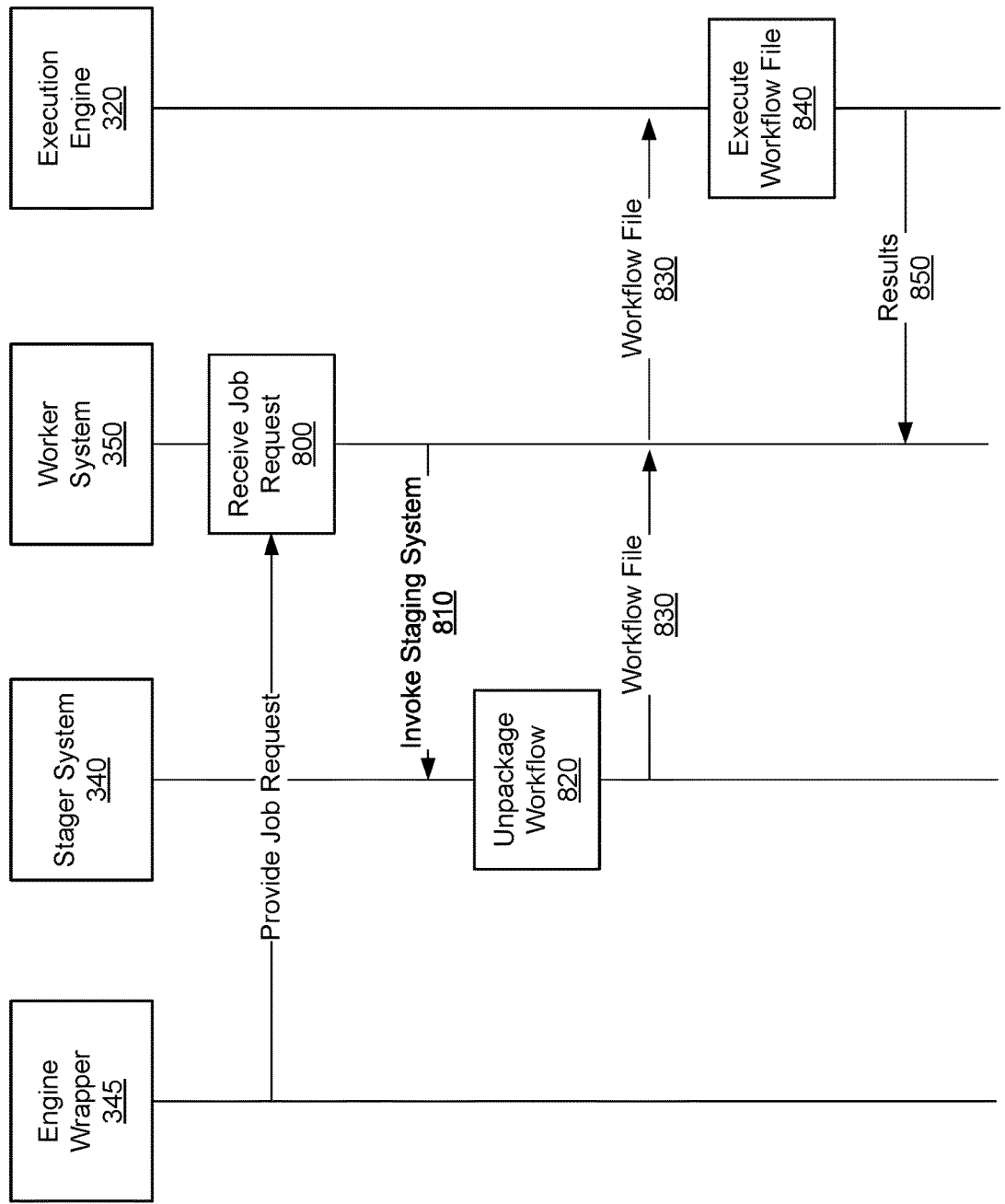
FIG. 8 is an interaction diagram that illustrates another example data flow for executing a workflow file from a client device, in accordance with some embodiments.

FIG. 8 is an interaction diagram that illustrates another example data flow for executing a workflow file from a client device 160, in accordance with some embodiments. Alternative embodiments may include more, fewer, or different steps and the steps may be performed in a different order, or by different components or systems, than those illustrated in FIG. 8.

When a data plane 150 has resources available to execute a workflow, the worker system 350 receives 800 a job request from the engine wrapper 345 and invokes 810 a stager system 340 to retrieve and unpackage 820 a workflow file associated with the job request. The stager system 340 passes the workflow file 830 to the worker system 350.

The worker system 350 prepares the workflow file and the execution engine 320 for execution. The worker system 350 also may launch the execution engine 320 if the execution engine 320 is not already running. In some embodiments, the worker system 350 identifies a type of execution engine 320 to use for the workflow file and launches or uses an execution engine 320 of the identified type to execute the workflow. The worker system 350 may provide the unpackaged workflow files 830 to the execution engine 320.

The execution engine 320 executes 840 the workflow file and provides the results 850 to the worker system 350. The worker system 350 may provide the results 850 to the workflow management module 300 (e.g., through a virtual filesystem 316) and the workflow management module 300 may publish the results to the cloud storage 310.

Figure 9:
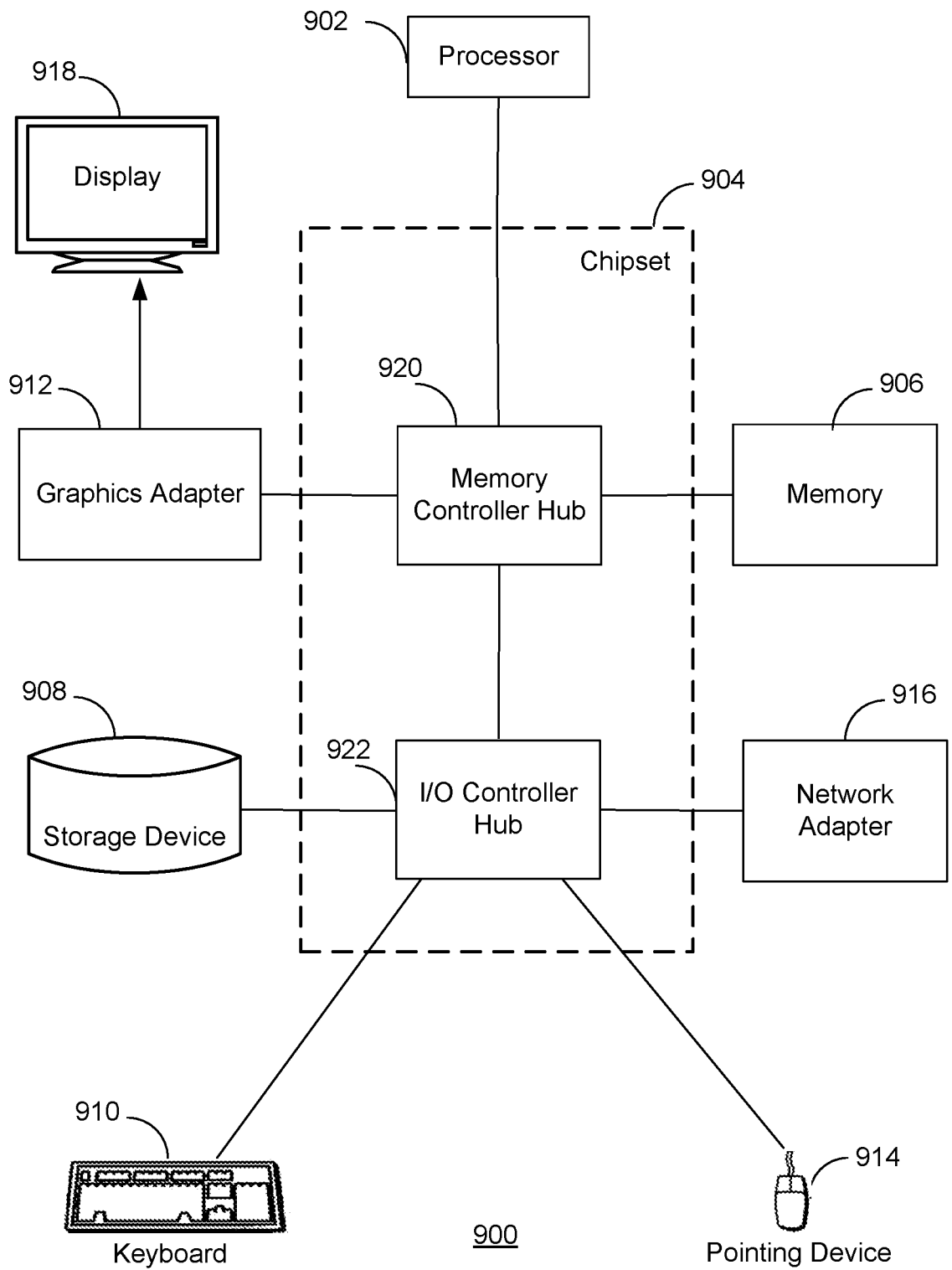
FIG. 9 is a high-level block diagram illustrating a functional view of a typical computer system for use as the data analytics system of FIG. 1, in accordance with some embodiments.

FIG. 9 is a high-level block diagram illustrating a functional view of a typical computer system 900 for use as the data analytics system 110 of FIG. 1 according to an embodiment.

The illustrated computer system includes at least one processor 902 coupled to a chipset 904. The processor 902 can include multiple processor cores on the same die. The chipset 904 includes a memory controller hub 920 and an input/output (I/O) controller hub 922. A memory 906 and a graphics adapter 912 are coupled to the memory controller hub 920 and a display 918 is coupled to the graphics adapter 912. A storage device 908, keyboard 910, pointing device 914, and network adapter 916 may be coupled to the I/O controller hub 922. In some other embodiments, the computer system 900 may have additional, fewer, or different components and the components may be coupled differently. For example, embodiments of the computer system 900 may lack displays and/or keyboards. In addition, the computer system 900 may be instantiated as a rack-mounted blade server or as a cloud server instance in some embodiments.

The memory 906 holds instructions and data used by the processor 902. In some embodiments, the memory 906 is a random-access memory. The storage device 908 is a non-transitory computer-readable storage medium. The storage device 908 can be a HDD, SSD, or other types of non-transitory computer-readable storage medium. Data processed and analyzed by the data analytics system 110 can be stored in the memory 906 and/or the storage device 908.

The pointing device 914 may be a mouse, track ball, or other type of pointing device, and is used in combination with the keyboard 910 to input data into the computer system 900. The graphics adapter 912 displays images and other information on the display 918. In some embodiments, the display 918 includes a touch screen capability for receiving user input and selections. The network adapter 916 couples the computer system 900 to the network 130.

The computer system 900 is adapted to execute computer modules for providing the functionality described herein. As used herein, the term "module" refers to computer program instruction and other logic for providing a specified functionality. A module can be implemented in hardware, firmware, and/or software. A module can include one or more processes, and/or be provided by only part of a process. A module is typically stored on the storage device 908, loaded into the memory 906, and executed by the processor 902.

ADDITIONAL CONSIDERATIONS

Some portions of the above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain embodiments described herein include process steps and instructions described in the form of an algorithm. It should be noted that the process steps and instructions of the embodiments could be embodied in software, firmware or hardware, and when embodied in software, could be downloaded to reside on and be operated from different platforms used by real time network operating systems.

Finally, it should be noted that the language used in the specification has been principally selected for readability and instructional purposes, and may not have been selected to delineate or circumscribe the inventive subject matter. Accordingly, the disclosure of the embodiments is intended to be illustrative, but not limiting.

We claim:

1. A method comprising:
   receiving, by a control plane of a data analytics system, a request from a client device to execute a workflow included in a packaged workflow file stored in cloud storage communicably coupled to the data analytics system;
   publishing, by the control plane of the data analytics system, a message to a message queue, the message requesting execution of the workflow and including metadata identifying the packaged workflow file;
   consuming, by a data plane of the data analytics system, the message via the message queue;
   responsive to consuming the message, creating, by the data plane of the data analytics system, an execution engine wrapper container within the data plane, the execution engine wrapper container comprising a virtualized instance of computational resources of the data analytics system and including an execution engine, wherein creating the execution engine wrapper container comprises defining resource parameters that limit use, by the execution engine wrapper container, of hardware resources of the data analytics system;
   retrieving, by the execution engine wrapper container, the packaged workflow file from the cloud storage using the metadata;
   generating, by the execution engine, results for the workflow by executing code of the packaged workflow file;
   deleting, by the data plane of the data analytics system, the execution engine wrapper container in response to detecting that the execution engine generated the results; and
   transmitting, by the control plane of the data analytics system, the results of executing the workflow to the client device.

2. The method of claim 1, wherein the packaged workflow file comprises one or more dependency files for the workflow.

3. The method of claim 1, wherein the control plane of the data analytics system is implemented in a virtual private cloud (VPC) different from a VPC of the data plane of the data analytics system.

4. The method of claim 1, wherein the cloud storage comprises a cloud storage system associated with an account owned by a user associated with the client device.

5. The method of claim 1, wherein the resource parameters limit allocation of memory of the data analytics system to the execution engine wrapper container.

6. The method of claim 1, wherein the resource parameters limit allocation of processing units of the data analytics system to the execution engine wrapper container.

7. The method of claim 1, wherein the data plane of the data analytics system consumes the message via the message queue in response to detecting that the data plane has sufficient available resources to execute the workflow.

8. A non-transitory computer-readable medium storing instructions that, when executed by a processor, cause the processor to perform operations comprising:
   receiving, by a control plane of a data analytics system, a request from a client device to execute a workflow included in a packaged workflow file stored in cloud storage communicably coupled to the data analytics system;
   publishing, by the control plane of the data analytics system, a message to a message queue, the message requesting execution of the workflow and including metadata identifying the packaged workflow file;
   consuming, by a data plane of the data analytics system, the message via the message queue;
   responsive to consuming the message, creating, by the data plane of the data analytics system, an execution engine wrapper container within the data plane, the execution engine wrapper container comprising a virtualized instance of computational resources of the data analytics system and including an execution engine, wherein creating the execution engine wrapper container comprises defining resource parameters that limit use, by the execution engine wrapper container, of hardware resources of the data analytics system;
   retrieving, by the execution engine wrapper container, the packaged workflow file from the cloud storage using the metadata;
   generating, by the execution engine, results for the workflow by executing code of the packaged workflow file;
   deleting, by the data plane of the data analytics system, the execution engine wrapper container in response to detecting that the execution engine generated the results; and
   transmitting, by the control plane of the data analytics system, the results of executing the workflow to the client device.

9. The non-transitory computer-readable medium of claim 8, wherein the packaged workflow file comprises one or more dependency files for the workflow.

10. The non-transitory computer-readable medium of claim 8, wherein the control plane of the data analytics system is implemented in a virtual private cloud (VPC) different from a VPC of the data plane of the data analytics system.

11. The non-transitory computer-readable medium of claim 8, wherein the cloud storage comprises a cloud storage system associated with an account owned by a user associated with the client device.

12. The non-transitory computer-readable medium of claim 8, wherein the resource parameters limit allocation of memory of the data analytics system to the execution engine wrapper container.

13. The non-transitory computer-readable medium of claim 8, wherein the resource parameters limit allocation of processing units of the data analytics system to the execution engine wrapper container.

14. The non-transitory computer-readable medium of claim 8, wherein the data plane of the data analytics system consumes the message via the message queue in response to detecting that the data plane has sufficient available resources to execute the workflow.

15. A system comprising:
   a processor; and
   a non-transitory computer-readable medium storing instructions that, when executed by the processor, cause the processor to perform operations comprising:
     receiving, by a control plane of a data analytics system, a request from a client device to execute a workflow included in a packaged workflow file stored in cloud storage communicably coupled to the data analytics system;
   publishing, by the control plane of the data analytics system, a message to a message queue, the message requesting execution of the workflow and including metadata identifying the packaged workflow file;
   consuming, by a data plane of the data analytics system, the message via the message queue;
   responsive to consuming the message, creating, by the data plane of the data analytics system, an execution engine wrapper container within the data plane, the execution engine wrapper container comprising a virtualized instance of computational resources of the data analytics system and including an execution engine, wherein creating the execution engine wrapper container comprises defining resource parameters that limit use, by the execution engine wrapper container, of hardware resources of the data analytics system;
   retrieving, by the execution engine wrapper container, the packaged workflow file from the cloud storage using the metadata;
   generating, by the execution engine, results for the workflow by executing code of the packaged workflow file;
   deleting, by the data plane of the data analytics system, the execution engine wrapper container in response to detecting that the execution engine generated the results; and
   transmitting, by the control plane of the data analytics system, the results of executing the workflow to the client device.

16. The system of claim 15, wherein the packaged workflow file comprises one or more dependency files for the workflow.

17. The system of claim 15, wherein the control plane of the data analytics system is implemented in a virtual private cloud (VPC) different from a VPC of the data plane of the data analytics system.

18. The system of claim 15, wherein the resource parameters limit allocation of memory of the data analytics system to the execution engine wrapper container.

19. The system of claim 15, wherein the resource parameters limit allocation of processing units of the data analytics system to the execution engine wrapper container.

20. The system of claim 15, wherein the data plane of the data analytics system consumes the message via the message queue in response to detecting that the data plane has sufficient available resources to execute the workflow.

* * * * *